Oct. 19, 1948.                T. J. DAVIS                2,451,720
                            CENTERING DEVICE
                           Filed June 7, 1946
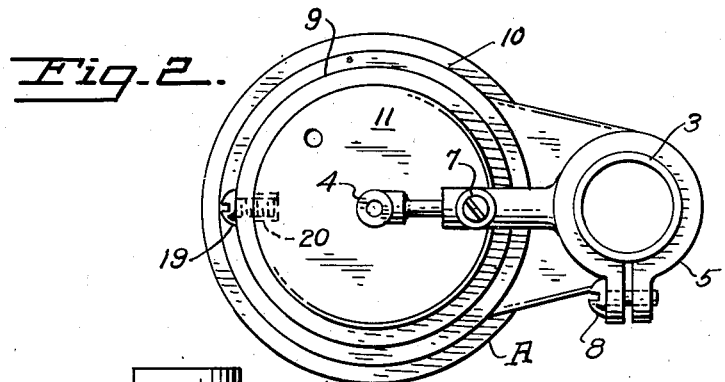
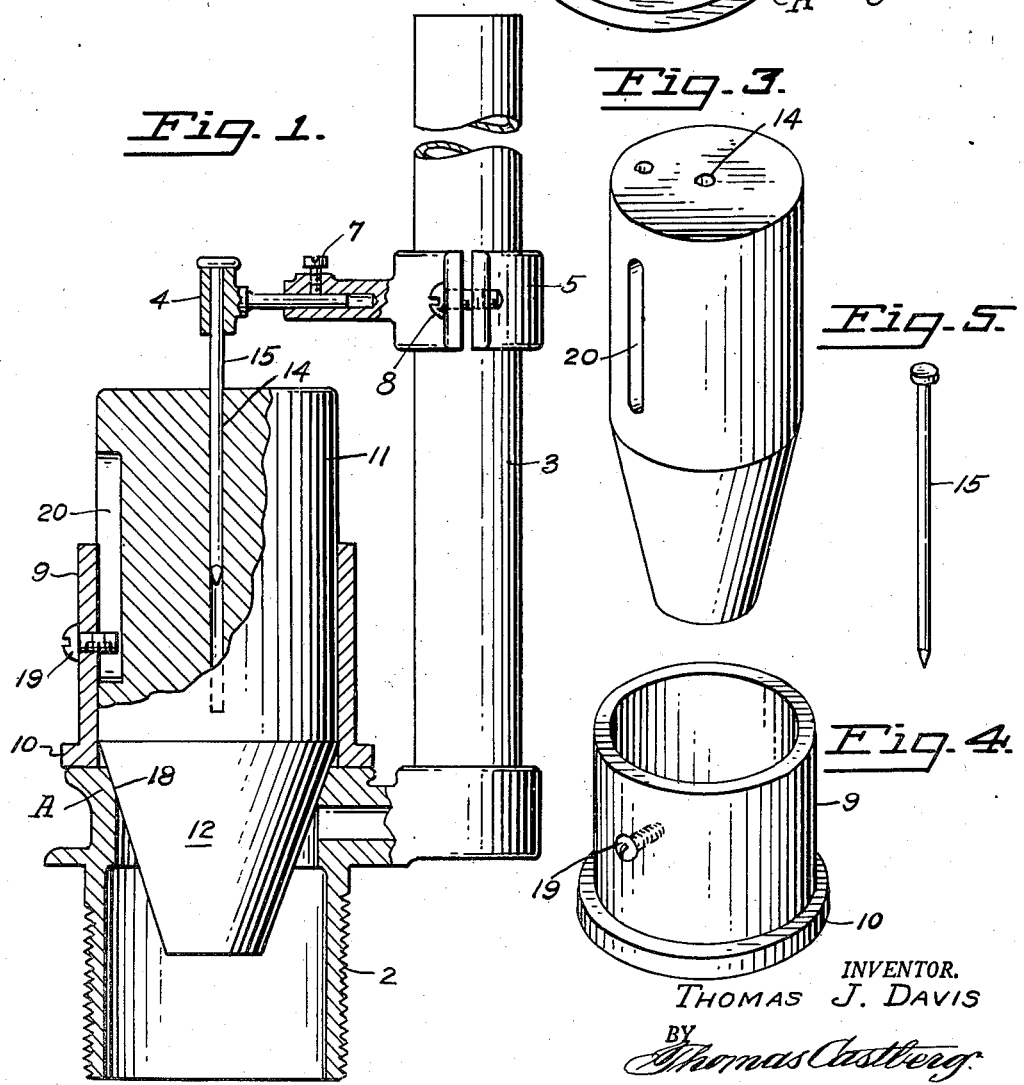
INVENTOR.
THOMAS J. DAVIS
BY
Thomas Castberg
ATTORNEY.

Patented Oct. 19, 1948

2,451,720

UNITED STATES PATENT OFFICE 2,451,720

CENTERING DEVICE

Thomas J. Davis, San Francisco, Calif.

Application June 7, 1946, Serial No. 675,277

1 Claim. (Cl. 33—180)

This invention relates to a device whereby the valve, the valve stem and the guide bearing in a toilet flushing tank may be accurately centered with relation to the valve seat.

The ball valve in a toilet flushing tank, together with the mechanism associated therewith, is subject to corrosion and to considerable wear and tear, and as such is a source of considerable water waste, as the moment wear or corrosion or both combined reach a certain stage, the valve fails to seat properly, hence leakage and waste of water with the result that when the leakage becomes noticeable or annoying, the home owner or someone in the family who is, or thinks he is, mechanically inclined usually tinkers or tries to repair or readjust the mechanism, and while such tinkering may temporarily reduce leakage, the plumber will eventually have to be called. Even so, the work done may not last too long as it is often done by a plumber's helper, and unless he really knows how to center the valve, the stem, and guide bearing with relation to the valve seat, leakage will soon occur again.

The object of this invention is to provide a centering device which can be used by the average tinkering mechanic or plumber's helper; to provide a centering device whereby positive centering of the valve, the stem and guide bearing is insured when replacing, repairing or adjusting the mechanism; to provide a centering device which is applicable to flushing valve mechanisms which may vary due to being made by different manufacturers; and further, to provide a centering device for the purpose described which may be so cheaply manufactured and sold that anyone can afford to have one.

The centering device is shown by way of illustration in the accompanying drawings, in which:

Fig. 1 is a side elevation partially in section showing a flush tank pipe assembly, said view also showing the centering device in position for use;

Fig. 2 is a plan view of Fig. 1;

Fig. 3 is a perspective view of the centering plug;

Fig. 4 is a perspective view of the sleeve which is used in conjunction with the centering plug; and Fig. 5 is a perspective view of the nail or pin used during the centering operation.

Referring to the drawings in detail, and particularly Fig. 1, A indicates the ball valve seat, 2 the overflow pipe, 3 the outlet pipe, and 4 the guide rod bearing and its associated clamp bracket 5. These members form what is known as a standard form of flushing tank valve assembly.

The ball valve itself is not shown, nor is the valve stem which is guided in the bearing 4, nor is the operating mechanism whereby the valve is lifted from its seat when the tank is to be flushed. The operating mechanism varies with different makes and may consist of a push lever or a pull chain which when actuated lifts the ball valve from its seat. The push lever or pull chain are in many instances subjected to considerable abuse as many persons exert a quick hard push or pull on the operating mechanism thereby imparting a jar or vibration or strain which in time may loosen either of the screws indicated at 7 and 8. For instance, if the screw 8 becomes loose, the clamp may slide down on the overflow pipe and may twist or turn thereon thereby disturbing the centering of the ball valve with relation to its seat. Again, if the screw 7 becomes loose, the valve guide rod bearing 4 will shift and throw the ball valve off center, etc., or cause excessive wear which will result in the same thing. In other words a leaking valve may be quickly remedied by properly adjusting these members. Again, if parts are worn out or broken, and replacement is required, it is obvious that when replacement is made, proper adjustment is required if the valve is to function properly.

The centering device forming the subject matter of this invention permits ready adjustment of old or new parts quickly and accurately by any person, skilled or otherwise. The device consists of a sleeve 9 having a collar 10 formed on its lower end. Mounted within the sleeve is a centering plug, the upper end 11 of which fits and is slidably mounted in the sleeve while the lower end is tapered or cone-shaped as shown at 12. The sleeve and centering plug is best shown in Figs. 3 and 4, and it should be noted that the plug has a central bore 14 formed in its upper end and a second bore at one side which is provided for the reception of a nail or pin 15, the purpose of which will hereinafter be described.

In actual operation let it be assumed that the screw 8 has become loose so that the clamp needs readjustment, and also that a new guide rod bearing 4 is required. If that is the case, the screw 7 will be loosened so that the worn guide can be removed and a new one inserted. The sleeves, together with the centering plug is then placed on the valve seat as shown in Fig. 1 and the plug is pushed downwardly through the sleeve until the cone-shaped end engages the annular inner wall 18 of the outlet pipe 2. When this is done the plug and sleeve will obviously assume a central position with relation to the valve seat A. The nail or pin 15 is now removed from the upper end of the centering plug and inserted in the new guide rod bearing 4. This, together with the clamp, is now adjusted and the pin is inserted in the central bore 14 formed in the upper end of the plug. The screws 7 and 8 are now tightened and positive and accurate centering of the clamp and guide rod bearing is thus assured. The pin 15 together with the plug and sleeve is now removed and the ball valve, together with its lift or guide rod, may be inserted and connected with the operating mechanism and perfect operation without leakage is now assured as the ball valve together with its guide or lift rod and bearing is properly and accurately positioned.

The operation and construction of the centering device is obviously so simple that it can be used by anyone whether a skilled mechanic or not, and as it is cheap, every home, apartment or hotel owner can afford to have one. The centering sleeve may be made of metal or any suitable material, and the centering plug may be made of wood or any other suitable material. It should be noted that the sleeve carries a screw 19 and that this extends into a slot 20 formed in one side of the centering plug. While the screw and slot are not essential, they are desirable as they prevent separation of the sleeve and plug, thus holding them together as a unit and preventing them from being separated and lost. If the nail or pin 15 should become lost or fall out of the bore provided for its reception, this can obviously be replaced with any old nail or the like. The collar or flange formed at the lower end of the sleeve is important as it seats on top of the valve seat A. These valve seats vary with different manufacturers. Some may be smaller in diameter and some larger, but the collar is made of such a diameter that it will take care of these variations. The cone-shaped end of the centering plug is also important as the interior diameter of the outlet pipe 2 varies with different makes. Hence, by having the centering plug cone-shaped, it will allow for such variations and will center the plug and sleeve properly under all conditions and while this and other features of the invention have been more or less specifically described and illustrated, it should be understood that changes may be resorted to within the scope of the appended claim and that the materials and finish of the several parts employed may be such as the experience or judgment of the manufacturer may dictate or varying conditions or uses may demand.

Having thus described my invention, what I claim and desire to secure by Letters Patent is:

A device for centering an adjustable overhanging valve stem guide bearing with relation to a valve seat comprising a cylindrical sleeve having an outturned flange at one end forming a planar collar adapted to rest upon the valve seat, a centering plug having a cylindrical upper portion fitting within said sleeve and a frusto-conical lower portion adapted to engage the interior surface of the valve seat, said plug having an axial bore extending partially therethrough and opening at the upper end thereof, a centering pin axially withdrawable from said plug and adapted to be inserted in the adjustable guide bearing and into said axial bore, and means for limiting the rotational and axial movement of said plug relative to said sleeve.

THOMAS J. DAVIS.

REFERENCES CITED

The following references are of record in the file of this patent:

UNITED STATES PATENTS

| Number | Name | Date |
| --- | --- | --- |
| 1,233,458 | Fisk | July 17, 1917 |
| 1,438,771 | Love | Dec. 12, 1922 |
| 1,505,561 | Guillet | Aug. 19, 1924 |
| 2,018,777 | Edwards | Oct. 29, 1935 |
| 2,258,386 | Heath | Oct. 7, 1941 |
| 2,348,878 | Behen | May 16, 1944 |